May 10, 1932.   P. M. NAGY   1,858,106
PIPE COUPLING
Filed Sept. 6, 1929
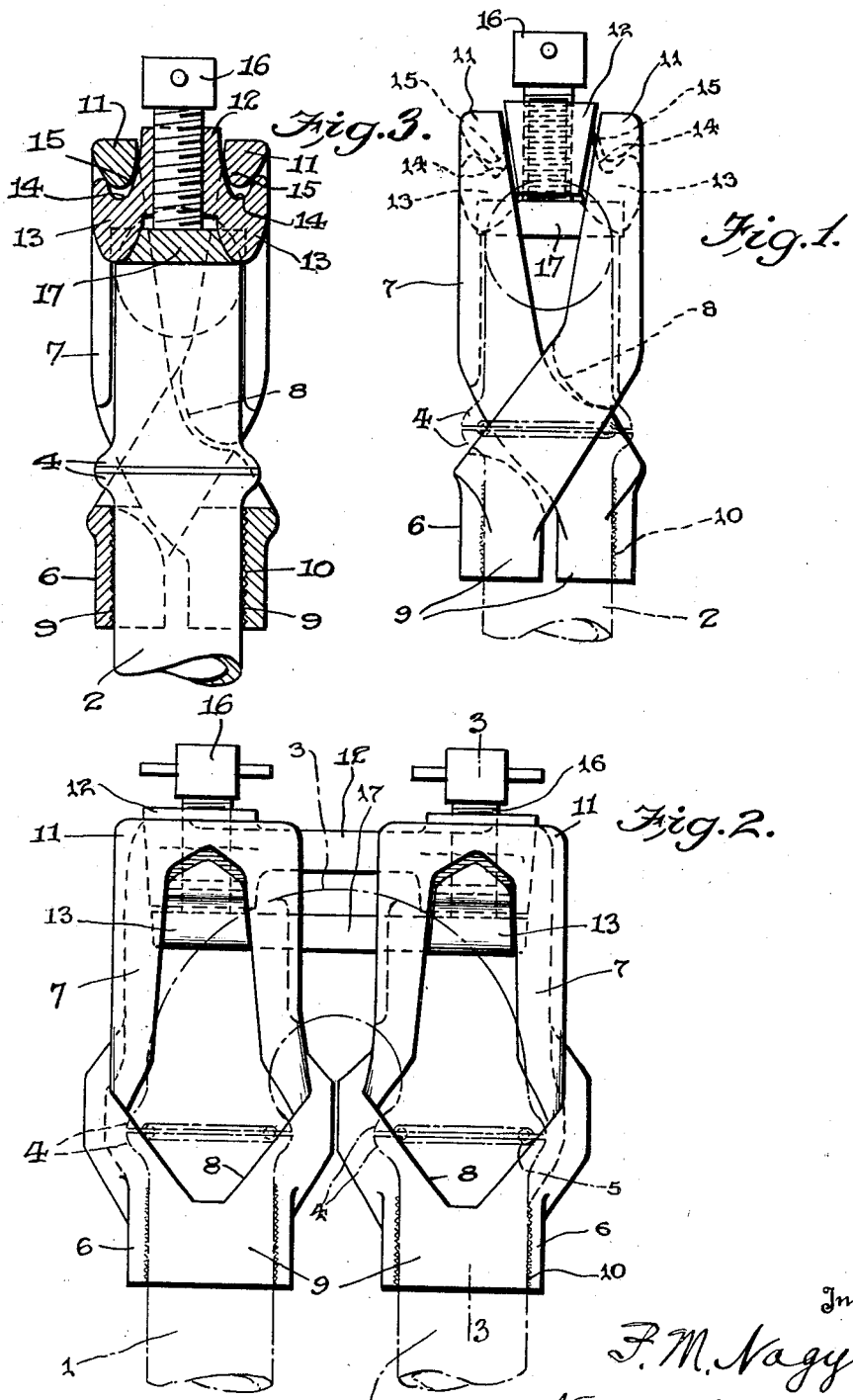

Patented May 10, 1932

1,858,106

UNITED STATES PATENT OFFICE

PETER MICHAEL NAGY, OF ALLIANCE, OHIO, ASSIGNOR TO TRANSUE & WILLIAMS STEEL FORGING CORPORATION, OF ALLIANCE, OHIO

PIPE COUPLING

Application filed September 6, 1929. Serial No. 390,802.

This invention relates to improvements in pipe couplings, and particularly to novel means for connecting a U-shaped pipe or return bend, to the ends of a plurality of parallel pipes.

Return bends are usually joined to pipe ends by threaded couplings, and as such structures must often withstand high temperatures and elevated pressures, they frequently break or leak.

The primary object of the present invention is to provide a coupling device in which pressure exerted internally on the return bend, will act to more securely clamp the device to the ends of the pipes.

A further object is to furnish a pipe coupling device which will expeditiously secure a return bend to pipe ends without threading either the pipe ends or the return bends.

A still further object is to provide a pipe coupling device including a plurality of jaw elements designed to securely grip the pipe ends when the return bend is forced toward the pipe ends.

With the foregoing objects outlined and with other objects in view which will appear as the description proceeds, the invention consists in the novel features hereinafter described in detail, illustrated in the accompanying drawings, and more particularly pointed out in the appended claims.

Referring to the drawings,

Fig. 1 is an end elevation of my improved device shown attached, and with the pipe ends and return bend in dotted lines.

Fig. 2 is a side elevation of the same.

In the drawings, 1 and 2 designate the ends of two pipes which are to be coupled by a return bend 3. For the purpose of the present invention, the ends of the pipes and the ends of the return bend are upset or expanded, as shown at 4, and between the abutting ends of the pipes and return bend, packing gaskets 5 are placed.

In order to hold the return bend in connection with the pipe ends, and to seal the joints, each pipe end is gripped by a pair of jaws 6 and 7 which are apertured or cut out to allow the return bend to pass between the same. The jaw 6 has an opening through the same as indicated at 8 in Fig. 1, and the walls of this opening are curved to form a fulcrum for the jaw 7. The lower ends 9 of each pair of jaws are knurled or roughened as shown at 10, and these ends grip the end of the pipe when the upper ends 11 of the jaws are forced together. For the purpose of forcing the upper ends of the jaws toward one another, a cross bar or bridge 12 is employed. This bridge bar cooperates with both pairs of jaws, and it is provided at its end portions with oppositely extending lugs 13 having downwardly diverging surfaces 14, which when the bar is raised, engage downwardly diverging surfaces 15 on the jaws, and thus cause the upper ends of the jaws to move toward one another. Obviously, as the upper ends of the jaws move toward each other, their lower ends also move toward each other and cause the knurled surfaces 10 to bite into the ends of the pipes.

It will be observed that the lugs 13 are of hook shape, and extend into openings in the faces of the jaws, and the hook formation acts to prevent the jaws from separating to too great an extent.

The bridge bar 12 is provided at its end portions with vertically disposed threaded apertures to receive screws 16, and the ends of these screws impinge against the ends of a cushion bar 17 that is slotted to receive and shaped to snugly engage the curved outer surface of the intermediate portion of the return bend. Consequently, when the screws are turned in the proper direction, they will force the cushion bar 17 against the return bend 3, and the ends of the return bend will thus be forced against the ends of the pipes 1 and 2.

It will be apparent from the foregoing explanation that the greater the pressure within the pipe line, the tighter will be the grip of the jaw ends 9 about the ends of the pipes 1 and 2, so that the present device will withstand high pressure without being ruptured.

I have shown the inside jaws 7 arranged to rock in the outside jaws 6, but I may use other forms of fulcrum supports, such as pins or axles.

While the device has been shown as connecting a return bend to the ends of two pipes, it will be noted that my form of coupling may be used where more than two pipes are to be coupled together to a manifold, by simply lengthening the cross beam 12 and providing a suitable number of sets of jaws and adjusting screws. It is also manifest that other forms of gaskets may be employed in place of the form illustrated.

My device has the following advantages:

1. A large area is provided for gripping the pipe ends, and the device provides a sure grip that is not dependent upon collars or offsets on the pipes.

2. It requires merely upsetting the pipe ends, and does not require special forms of pipe flanges or rings.

3. It does not depend upon threaded pipe ends to hold the parts together.

While I have disclosed the invention in such manner that it may be readily understood by those skilled in the art, I am aware that various changes may be made in the details disclosed, without departing from the spirit of the invention, as expressed in the claims.

What I claim and desire to secure by Letters Patent is:

1. A pipe coupling device comprising pairs of jaws adapted to grip pipe ends, and means connecting said jaws and adapted to bear against an intermediate pipe having its ends engaging the first mentioned pipe ends, said means increasing the grip of the jaws on the first mentioned pipes as pressure of the intermediate pipe increases on said means.

2. A pipe coupling device comprising sets of jaws adapted to grip pipe ends, a clamping member joining said sets of jaws, and including means for forcing certain ends of the sets of jaws together.

3. A pipe coupling device including sets of jaws adapted to grip pipe ends, means for forcing certain ends of the sets of jaws together, a cushion member, and means operatively connecting said cushion member to the first mentioned means.

4. A device for connecting a return bend or the like to pipe ends, and for forcing the ends of the return bend against the ends of the pipes, comprising members adapted to clamp the pipe ends, a cushion member adapted to bear against the return bend, and means for simultaneously forcing the cushion member against the return bend and for forcing the clamping members into engagement with the pipe ends.

5. A device of the character described, comprising pairs of jaws, the jaws of each pair being pivotally connected together and certain ends of the jaws being adapted to grip pipe ends, and means for forcing the opposite ends of the jaws toward each other.

6. A device of the character described, comprising pairs of jaws, the jaws of each pair being pivotally connected together and certain ends of the jaws being adapted to grip pipe ends, and means for forcing the opposite ends of the jaws toward each other, the last mentioned means including cooperating diverging surfaces on the jaws and on said means.

7. In a device of the character described, pairs of pipe gripping jaws, a member cooperating with the jaws for moving certain ends of the same together when said member is moved in one direction, screws having threaded connection with said member, and a cushion member actuated by said screws.

8. A device of the character described, including pairs of jaws adapted to grip pipe ends, a member cooperating with said jaws and adapted when moved in one direction to cause the jaws to more tightly grip the pipe ends, adjustable elements cooperating with said member, and a cushion member actuated by said adjustable elements.

9. In a device of the character described, a plurality of sets of pipe gripping jaws having apertures therein, a cross beam having lugs extending into the apertures for joining the beam to the jaws, said beam and jaws having cooperating cam surfaces for causing certain ends of the jaws to move toward each other when the beam is moved in one direction, adjustable elements operatively connected to said cross beam, and a cushion member actuated by said adjustable elements, and adapted to force a return bend pipe or the like, toward the pipe ends gripped by the jaws.

In testimony whereof I have signed this specification.

PETER MICHAEL NAGY.